(12) United States Patent
Chatradhi et al.

(10) Patent No.: US 9,548,070 B1
(45) Date of Patent: Jan. 17, 2017

(54) HDD MAGNETIC HEAD DEGRADATION FIELD-FAILURE DETECTION AND PREDICTION

(71) Applicant: HGST Netherlands B.V., Amsterdam (NL)

(72) Inventors: Sridhar Chatradhi, San Jose, CA (US); Martin Aureliano Hassner, Mountain View, CA (US); Natasa Letourneaut, Rochester, MN (US); Satoshi Yamamoto, San Jose, CA (US)

(73) Assignee: Western Digital Technologies, Inc., Irving, CA (US)

( * ) Notice: Subject to any disclaimer, the term of this patent is extended or adjusted under 35 U.S.C. 154(b) by 0 days.

(21) Appl. No.: 14/750,815

(22) Filed: Jun. 25, 2015

(51) Int. Cl.
*G11B 5/455* (2006.01)
*G06N 7/00* (2006.01)

(52) U.S. Cl.
CPC ............... *G11B 5/455* (2013.01); *G06N 7/005* (2013.01)

(58) Field of Classification Search
CPC ........... G11B 5/012; G11B 5/02; G11B 5/455; G11B 19/04–19/041; G11B 19/048; G11B 27/36
USPC ....................... 360/31, 46, 53, 55, 67–69, 75
See application file for complete search history.

(56) References Cited

U.S. PATENT DOCUMENTS

| | | | |
|---|---|---|---|
| 5,410,439 A * | 4/1995 | Egbert | G11B 33/10 360/75 |
| 5,539,592 A | 7/1996 | Banks et al. | |
| 6,249,890 B1 * | 6/2001 | Ukani | G06F 11/008 360/53 |
| 6,359,433 B1 * | 3/2002 | Gillis | G11B 5/012 324/210 |
| 6,373,647 B1 | 4/2002 | Baker | |
| 6,671,111 B2 | 12/2003 | Ottesen et al. | |
| 6,690,532 B1 | 2/2004 | Choo et al. | |
| 6,771,440 B2 | 8/2004 | Smith | |
| 7,062,698 B2 | 6/2006 | Yang | |
| 7,064,914 B1 | 6/2006 | Erden et al. | |
| 7,113,355 B2 * | 9/2006 | Hidaka | B82Y 10/00 360/31 |
| 7,193,824 B2 * | 3/2007 | Naka | B82Y 10/00 29/603.09 |
| 7,304,816 B2 * | 12/2007 | Johnson | G11B 19/04 360/31 |
| 7,310,742 B2 * | 12/2007 | Zimmer | G06F 11/0727 714/4.2 |
| 7,317,597 B2 * | 1/2008 | Naka | B82Y 10/00 29/603.09 |
| 7,336,434 B2 | 2/2008 | Lille et al. | |

(Continued)

*Primary Examiner* — Wayne Young
*Assistant Examiner* — James L Habermehl
(74) *Attorney, Agent, or Firm* — Joan Pennington

(57) ABSTRACT

A method, apparatus, and system for implementing head degradation detection and prediction for hard disk drives (HDDs) are provided. Statistical parameter stability tests are used that are calculated as Confidence Intervals (CIs) from HDD parameter measurements. HDD parameters include, for example, change or delta in fly height (dFH), magnetic resistor resistance (MRR) head values, servo variable gain amplifier (SVGA) readback amplitude values, that are used in conjunction with two or more confidence level indicators and an Auto-Regressive Integrated Moving-Average (ARIMA) (p, d, q) predictor for head degradation detection and field failure prediction.

20 Claims, 7 Drawing Sheets

(56) References Cited

U.S. PATENT DOCUMENTS

| | | | |
|---|---|---|---|
| 7,593,176 B2* | 9/2009 | Yoshida | G11B 20/10009 360/31 |
| 7,613,975 B2* | 11/2009 | Jibry | G11B 20/1816 360/31 |
| 7,633,694 B2* | 12/2009 | Alex | G11B 5/455 360/31 |
| 7,652,840 B2* | 1/2010 | Henry | G11B 5/40 360/75 |
| 7,667,456 B2* | 2/2010 | Naka | B82Y 10/00 324/210 |
| 7,706,098 B2* | 4/2010 | Sato | G11B 5/6005 360/75 |
| 7,881,006 B2* | 2/2011 | Raghunathan | G11B 5/3166 360/77.02 |
| 8,238,051 B2 | 8/2012 | Baumgart et al. | |
| 8,891,188 B2* | 11/2014 | Kasai | G11B 19/048 360/31 |
| 9,070,390 B2* | 6/2015 | Green | G11B 5/455 |
| 2003/0030934 A1 | 2/2003 | Schaff et al. | |
| 2005/0286150 A1* | 12/2005 | Baumgart | G11B 19/04 360/31 |
| 2008/0074772 A1* | 3/2008 | Yamasaki | G11B 5/40 360/31 |
| 2008/0165444 A1 | 7/2008 | Zafer | |
| 2008/0297939 A1* | 12/2008 | Amemiya | G11B 5/40 360/75 |
| 2010/0073795 A1* | 3/2010 | Amano | G11B 5/6005 360/31 |

* cited by examiner

UNSTABLE DATA TREND ARIMA(p, d, q) MEMORY MODEL
300

ARIMA(p, d, q)-MODEL IS THE FINITE- DIFFERENCE EQUATION DEFINED BY AR-POLYNOMIAL $\phi(B)$, OF DEGREE P, MA-POLYNOMIAL $\theta(B)$ OF DEGREE Q, IN THE VARIABLE B, $BX_T+W_{T-1}$ IS THE BACKWARD SHIFT OPERATOR $\theta(B)(1-B)^d X_T = \theta(B)X^*_T$ $(1-B)^d$ IS THE D-TH DIFFERENCING-OPERATOR THAT TRANSFORMS $\{X_T\}$ INTO A STATIONARY-TIME SERIES $\{X^*_T\}$ IS ITS MOVING-BLOCK-AVERAGE i.i.d-SEQUENCE

302

ARIMA(p, d, q)- MEMORY MODEL GENERATES A TIME SERIES THAT PREDICTS THE STATIONARY TIME SERIES $(1-B)^d X_T$
304

FIG. 3

HDD-HEAD MRR/dFH/SVGA ARIMA (p, d, q) MODEL FIT
400

ARIMA (2,2,1) FITS MRR UNSTABLE TREND (RESIDUAL ACF SAMPLE VALUES ARE NEGLIGIBLE)
402

↓

ARIMA (1,1,0) FITS dFH UNSTABLE TREND (RESIDUAL ACF SAMPLE VALUES ARE NEGLIGIBLE)
404

↓

ARIMA (1,1,0) FITS SVGA UNSTABLE TREND (RESIDUAL ACF SAMPLE VALUES ARE NEGLIGIBLE)
406

FIG. 4

HDD MAGNETIC HEAD DEGRADATION FIELD-FAILURE DETECTION AND PREDICTION

FIELD OF THE INVENTION

The present invention relates generally to the data storage field, and more particularly, relates to a method, apparatus, and system for implementing reliable field failure magnetic head degradation detection and prediction for hard disk drives (HDDs).

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

A need exists to detect the onset of head degradation, as well as forecast its duration, for the purpose of predicting risk of individual head failure in the field. Existing solutions are generally unreliable and generate inaccurate failure indications.

A need exists for an effective and efficient mechanism for implementing reliable field failure head degradation detection and prediction for hard disk drives (HDDs).

SUMMARY OF THE INVENTION

Aspects of the preferred embodiments are to provide a method, apparatus, and system for implementing head degradation detection and prediction for hard disk drives (HDDs). Other important aspects of the preferred embodiments are to provide such method, apparatus, and system substantially without negative effect and to overcome some of the disadvantages of prior art arrangements.

In brief, a method, apparatus, and system are provided for implementing head degradation detection and failure prediction for hard disk drives (HDDs). Soft error indicators are used in conjunction with two or more confidence level indicators for head degradation detection and prediction, for example, with an Auto-Regressive Integrated Moving-Average (ARIMA)(p, d, q) memory model to identify outlier heads and provide a lead-time for head failure prediction.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 illustrates example Auto Regressive Integrated Moving Average (ARIMA)(p, d, q) memory model apparatus for implementing head degradation prediction for hard disk drives (HDDs) in accordance with preferred embodiments;

FIG. 4 illustrates example magnetic resistor resistance (MRR), delta in fly height (dFH), readback servo variable gain amplifier (SVGA) magnetic head parameters used in an ARIMA(p, d, q) model fit in accordance with preferred embodiments;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the preferred embodiments, a method, apparatus, and system for implementing head degradation detection and prediction for field failure for hard disk drives (HDDs). Statistical parameter stability tests are calculated as Confidence Intervals (CIs) for predefined HDD parameters. Soft error indicators also are used in conjunction with two or more confidence level indicators for head degradation detection and prediction to identify outlier heads and provide an error trigger. Soft error indicators include for example, soft error rate (SER) fluctuation, and error recovery procedure (ERP) count. HDD parameter confidence level indicators include for example, change or delta in fly height (dFH), magnetic resistor resistance (MRR) value of the head, and amplitude of the readback servo variable gain amplifier (SVGA), for values for an exemplary preamble of a servo sector.

In accordance with features of the preferred embodiments, a detection algorithm calculates Confidence Intervals (CIs) for mean values of delta in fly height (dFH), magnetic resistor resistance (MRR) value, and example amplitude of the readback servo variable gain amplifier (SVGA) per head, using both standard mean and bootstrap or randomized moving average means. A CI-Length difference (Moving-Average CI Length–Standard-CI Length), is used as a head degradation detection metric and has been shown to be robust across several HDD products, using measured data. This metric identifies, for example, about 1% of an RDT-Head Population, for which the (dHH, MRR, SVGA)-CI-Length–Difference/Head exceeds preset thresholds. A list of heads identified by this detection metric is then further enhanced by conditioning detection of the onset of head-instability on the existence of both soft error rate (SER) fluctuations, and error recovery procedure (ERP) count exceeding prespecified thresholds, to identify a head-at-risk or predict head failure.

Figure 1:
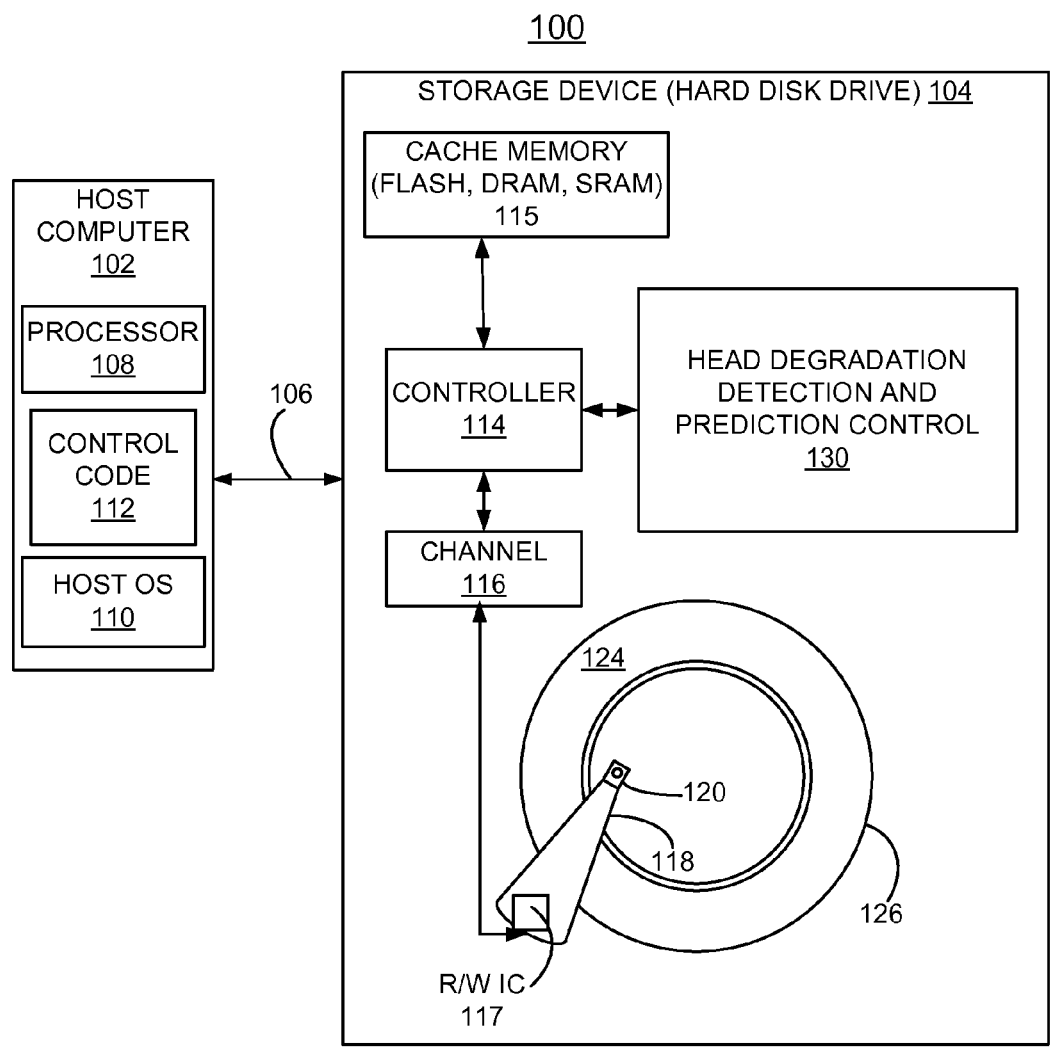
FIG. 1 is a block diagram representation illustrating a system for implementing head degradation detection and failure prediction for hard disk drives (HDDs) in accordance with preferred embodiments.

Having reference now to the drawings, in FIG. 1, there is shown an example system generally designated by the reference character 100 for implementing magnetic head degradation detection and prediction for various hard disk drives (HDDs) in accordance with preferred embodiments. System 100 includes a host computer 102, a storage device 104, such as a hard disk drive (HDD) 104, and an interface 106 between the host computer 102 and the storage device 104.

As shown in FIG. 1, host computer 102 includes a processor 108, a host operating system 110, and control code 112. The storage device or hard disk drive 104 includes a controller 114 coupled to a cache memory 115, for example, implemented with one or a combination of a flash memory, a dynamic random access memory (DRAM) and a static random access memory (SRAM), and coupled to a data channel 116. The storage device or hard disk drive 104 includes a Read/Write (R/W) integrated circuit (IC) 117 implementing HDD-parameter measurement of the preferred embodiments. The storage device or hard disk drive 104 includes an arm 118 carrying a slider 120 for in accordance with preferred embodiments. The slider 120 flies over a writable disk surface 124 of a disk 126.

In accordance with features of preferred embodiments, a head degradation detection and prediction control 130 is provided with the controller 114, for example, for implementing head degradation detection and prediction for hard disk drives (HDDs), as shown in FIG. 1.

System 100 including the host computer 102 and the HDD 104 is shown in simplified form sufficient for understanding the present embodiments. The illustrated host computer 102 together with the storage device or HDD 104 is not intended to imply architectural or functional limitations. The present invention can be used with various hardware implementations and systems and various other internal hardware devices.

In accordance with features of preferred embodiments, the HDD 104 is enabled to communicate various parameters and threshold information, requests, and responses with the host computer 102. For example, control code 112 enables the host computer 102 to send one or more commands to the HDD 104 requesting existing information on parameters in the HDD 104. Also the host computer 102 is enabled to change one or more thresholds and other settings in the HDD 104.

Figure 2:
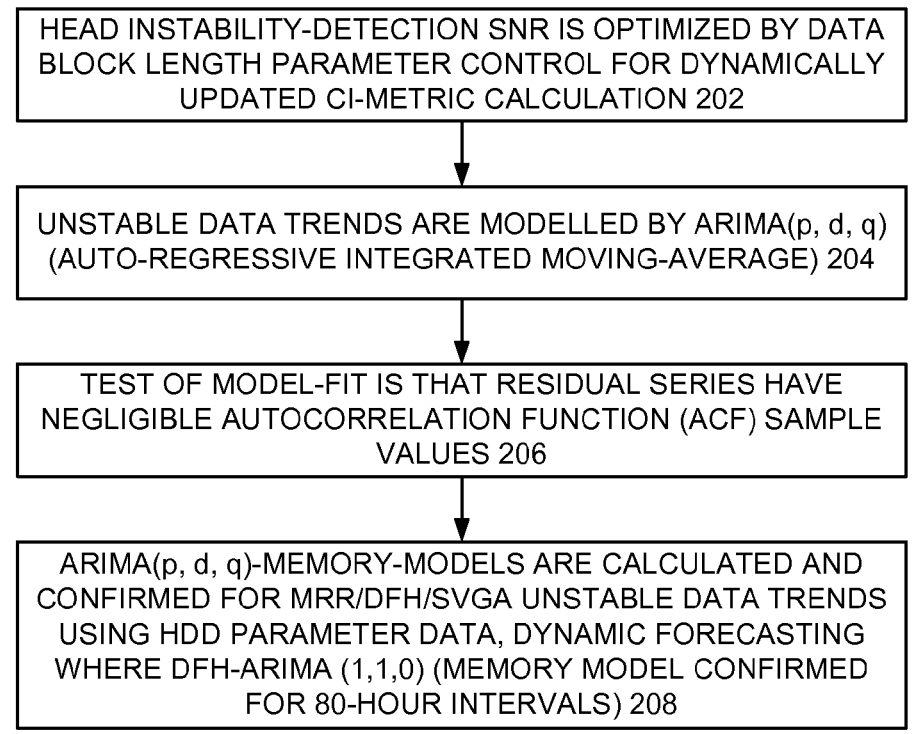
FIG. 2 is a flow chart illustrating example process operations for implementing head degradation detection and prediction by calculating confidence levels in accordance with preferred embodiments.

Referring now FIG. 2, there are shown example process operations generally designated by the reference character 200 for implementing head degradation detection and prediction for hard disk drives (HDDs) by dynamically calculating confidence levels of the preferred embodiments as well as calculating (p, d, q) parameters of the ARIMA(p, d, q) predictor for dFH, MRR, SVGA parameter time-series.

As shown in FIG. 2, head degradation-detection signal-to-noise ratio (SNR) is optimized by Data Block Length parameter control for dynamically updated CI metric calculation as indicated in a block 202. Unstable data trends are modeled by Auto-Regressive Integrated Moving-Average (ARIMA) (p, d, q) as indicated in a block 204. Test of model-fit for each head parameter, is that residual series have negligible Autocorrelation Function (ACF) sample values as indicated in a block 206. ARIMA (p, d, q) memory models are calculated and confirmed for MRR/dFH/SVGA unstable data trends (using CBF data), dynamic forecasting where dFH-ARIMA (1, 1, 0) memory model confirmed for 80-hour intervals as indicated in a block 208.

Referring now FIG. 3, there is shown example unstable data trend Auto Regressive Integrated Moving Average (ARIMA) memory model apparatus generally designated by the reference character 300 for implementing head degradation prediction for hard disk drives (HDDs) in accordance with preferred embodiments. ARIMA 300 memory model apparatus 300 includes ARIMA(p, d, q) model is the finite-difference equation defined by AR-polynomial $\phi(B)$, of degree p, MA-polynomial $\theta(B)$ of degree q, in the variable B, $BX_T = X_{T-1}$ is the backward shift operator $$\theta(B)(1-B)^d X_T = \theta(B) X^*_T, \text{ where}$$

$(1-B)^d$ is the d-th differencing-operator that transforms $\{X_T\}$ into a stationary time series; and
$\{X^*_T\}$ is the resulting moving-block-average i.i.d-sequence.

ARIMA (p, d, q) memory model 300 generates a time series that predicts the stationary time series represented by:

$$(1-B)^d X_T$$

as indicated in a block 304.

Referring now FIG. 4, there is shown example magnetic resistor resistance (MRR), delta in fly height (dFH), readback servo variable gain amplifier (SVGA) ARIMA model fit generally designated by the reference character 400 in accordance with preferred embodiments. As indicated in a block 402, ARIMA(2, 2, 1) fits MRR unstable trend (ACF sample values are negligible). As indicated in a block 404, ARIMA(1, 1, 0) fits dFH unstable trend (ACF sample values are negligible). As indicated in a block 406, ARIMA(1, 1, 0) fits SVGA unstable trend (ACF sample values are negligible).

Figure 5:
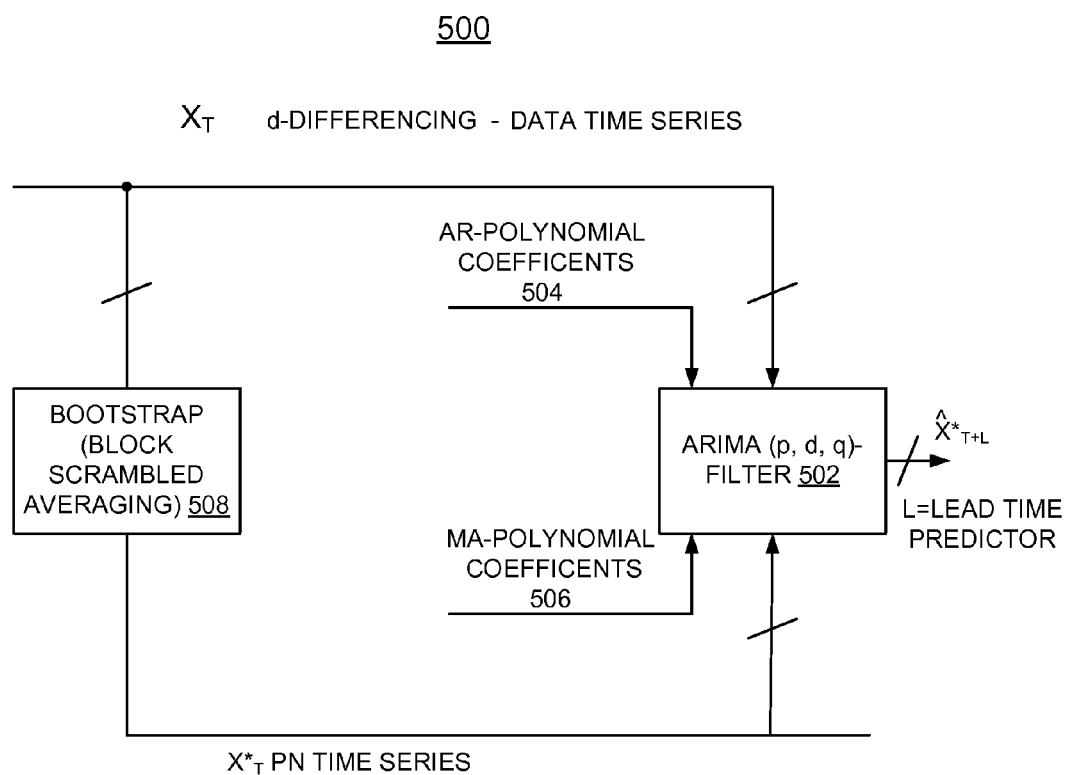
FIG. 5 illustrates example Auto Regressive Integrated Moving Average (ARIMA)(p, d, q) HDD parameter time-series predictor apparatus for implementing head degradation detection and prediction for hard disk drives (HDDs) in accordance with preferred embodiments.

Referring now FIG. 5, there is shown example Auto Regressive Integrated Moving Average (ARIMA) HDD parameter time-series predictor apparatus generally designated by the reference character 500 for implementing head degradation detection and prediction for hard disk drives (HDDs) in accordance with preferred embodiments. ARIMA-HDD parameter time-series predictor apparatus 500 includes an ARIMA (p, d, q) filter 502 receiving AR polynomial coefficients 504 and MA polynomial coefficients 506, and a bootstrap (block scrambled averaging) function 508 coupled to the ARIMA (p, d, q) filter 502. ARIMA (p, d, q) filter 502 receives inputs $X^*_T$ PN time series and $X_T$ d-differencing—data time series, and providing maximum likelihood estimate output $X^*_{T+L}$, where L=lead time predictor.

Figure 6:
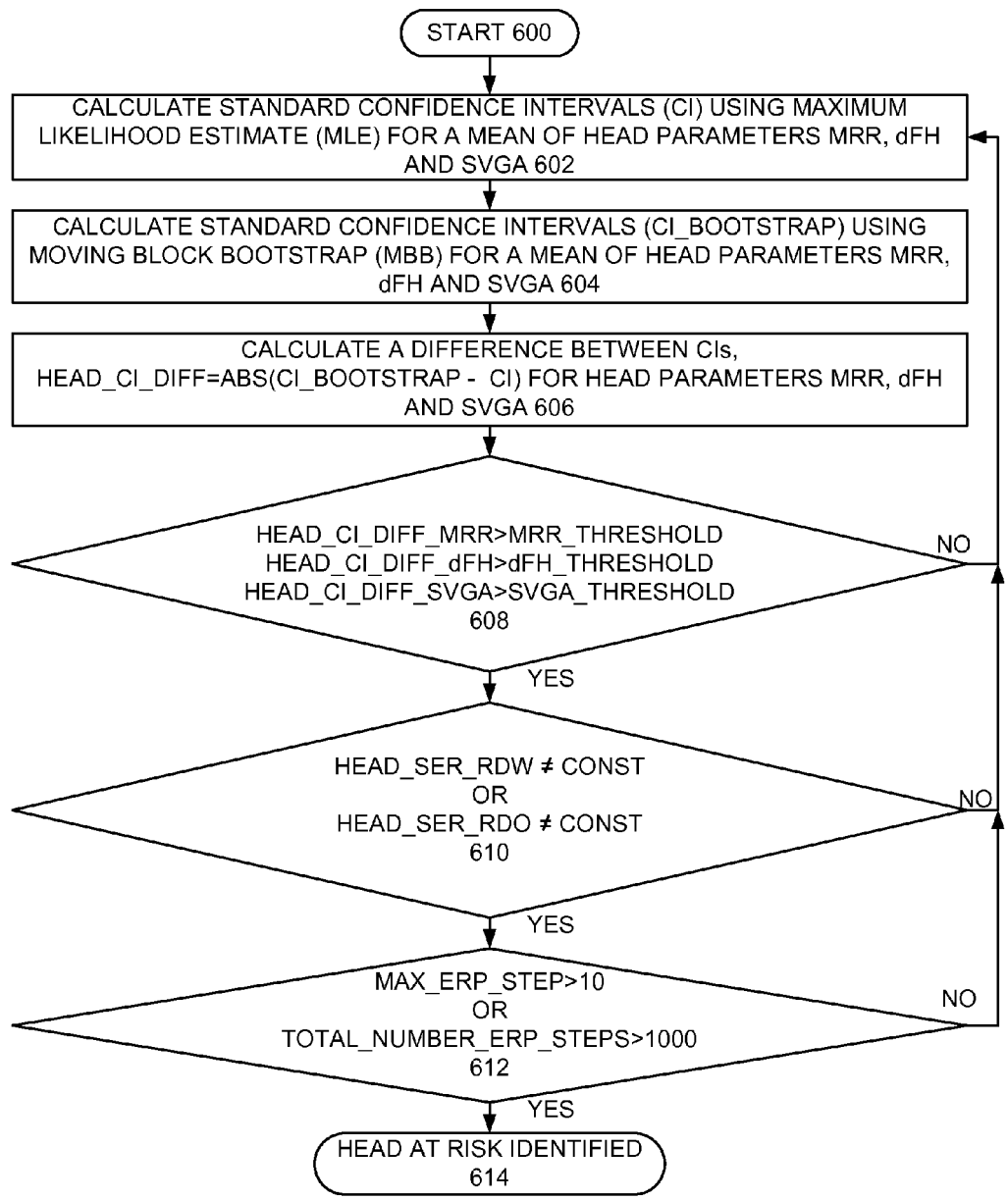
FIG. 6 is a flow chart illustrating example operations for implementing Head degradation detection and prediction by use of HDD-Parameter Confidence-Interval for hard disk drives (HDDs) in accordance with preferred embodiments.

Referring now FIG. 6, there are shown example operations for implementing Head degradation detection and prediction by use of HDD-Parameter Confidence-Interval for hard disk drives (HDDs) in accordance with preferred embodiments starting at a block 600. As indicated in a block 602, standard confidence intervals (CI) are calculated using maximum likelihood estimate (MLE) for a mean of head parameters MRR, dFH, and SVGA. Standard confidence intervals (CI_bootstrap) are calculated using moving block bootstrap (MBB) for a mean of head parameters MRR, dFH, and SVGA as indicated in a block 604. A difference between the confidence intervals (CI) and (CI_bootstrap) are calculated for head parameters MRR, dFH, and SVGA as indicated in a block 606. As indicated in a decision block 608, the calculated difference confidence intervals (CI) for MRR is compared with a predefined MRR threshold, the calculated difference confidence intervals (CI) for dFH is compared with a predefined dFH threshold, and the calculated difference confidence intervals (CI) for SVGA is compared with a predefined SVGA threshold. When the compared values are not greater than the predefined threshold values, operations return to block 602 and continue. When the compared values are greater than the predefined threshold values, checking whether the head soft error rate for read-write or the head soft error rate for read only is not constant or fluctuates are performed as indicated in a decision block 610. When the head soft error rates are constant or do not fluctuate, operations return to block 602 and continue. When the head soft error rates are not constant or fluctuate, checking whether the maximum error recovery procedure (ERP) count or step is greater than a predefined value of a total number of ERP count or steps are greater than another predefined value are performed as indicated in a decision block 612. When the ERP count or steps are not greater than the predefined values, operations return to block 602 and continue. When the ERP count or steps is greater than the predefined values, a head at risk is identified as indicated in a block 614.

In accordance with features of preferred embodiments, for example, the HDD 104 optionally communicates various parameter and threshold information with the host computer 102 and the host computer 102 optionally changes one or more thresholds and other settings in the HDD 104, such as window length and window move samples for the calculations at blocks 602, 604, the MRR threshold, dFH threshold, the SVGA threshold and the ERP count or step values compared at decision blocks 608, 610.

Figure 7:
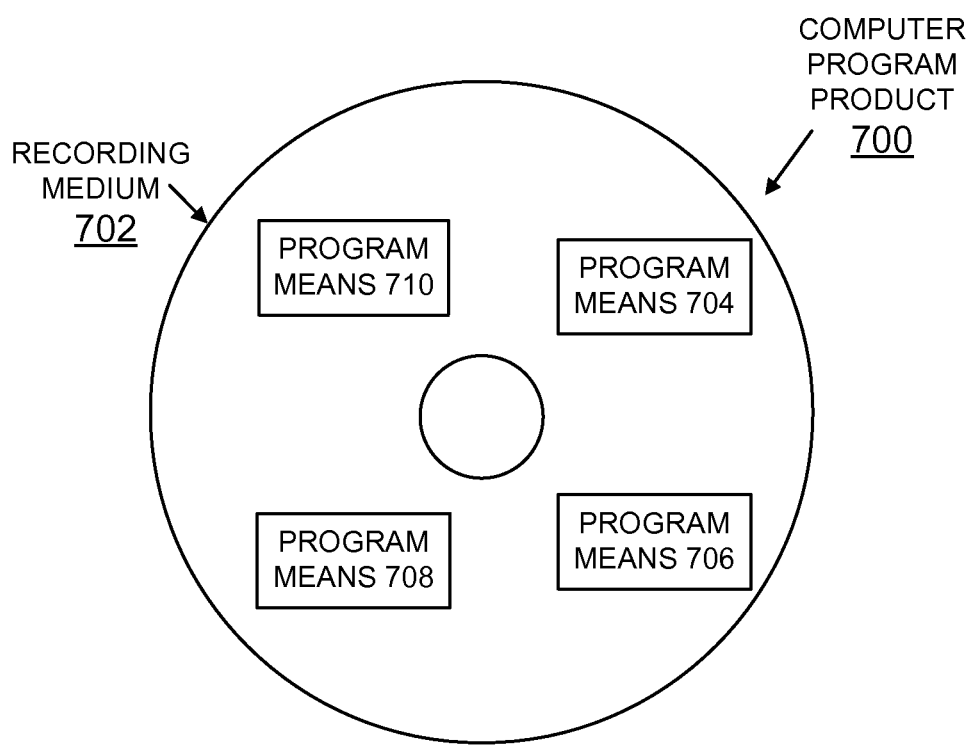
FIG. 7 is a block diagram illustrating a computer program product in accordance with preferred embodiments.

Referring now to FIG. 7, an article of manufacture or a computer program product 700 of the preferred embodiments is illustrated. The computer program product 700 includes a computer readable recording medium 702, such as, a floppy disk, a high capacity read only memory in the form of an optically read compact disk or CD-ROM, a tape, or another similar computer program product. Computer readable recording medium 702 stores program means or control code 704, 706, 708, 710 on the medium 702 for carrying out the methods for implementing enhanced head degradation detection and prediction for hard disk drives in accordance with preferred embodiments in the system 100 of FIG. 1.

A sequence of program instructions or a logical assembly of one or more interrelated modules defined by the recorded program means or control code 704, 706, 708, 710, direct HDD controller 114 for implementing head degradation detection and prediction using dynamical calculation of confidence levels during HDD operation of preferred embodiments.

While the present invention has been described with reference to the details of the embodiments of the invention shown in the drawing, these details are not intended to limit the scope of the invention as claimed in the appended claims.

What is claimed is:

1. A method for implementing head degradation detection and field failure prediction for hard disk drives (HDDs), said method comprising:
calculating two or more confidence level indicators for predefined HDD head parameters;
comparing said calculated confidence level indicators with a respective predefined threshold value for the predefined HDD head parameters for providing a head failure prediction; and identifying both soft error rate (SER) fluctuations, and an error recovery procedure (ERP) count exceeding a prespecified threshold, to provide the head failure prediction.

2. The method as recited in claim 1, wherein said predefined HDD head parameters include change or delta in fly height (dFH), magnetic resistor resistance (MRR) value of the head, and servo variable gain amplifier (SVGA) readback amplitude values.

3. A method for implementing head degradation detection and field failure prediction for hard disk drives (HDDs), said method comprising:
calculating two or more confidence level indicators for predefined HDD head parameters including calculating confidence intervals (CI) using maximum likelihood estimate (MLE) for predefined HDD head parameters; and
comparing said calculated confidence level indicators with a respective predefined threshold value for the predefined HDD head parameters for providing a head failure prediction.

4. The method as recited in claim 3, further includes calculating confidence intervals (CI_bootstrap) using moving block bootstrap (MBB) for predefined HDD head parameters.

5. The method as recited in claim 4, includes calculating difference confidence interval values of the confidence intervals (CI) and (CI_bootstrap) for predefined HDD head parameters.

6. The method as recited in claim 5, wherein comparing said calculated confidence level indicators with a respective predefined threshold value for the predefined HDD head parameters includes comparing said calculated difference confidence interval values with respective predefined threshold value for the predefined HDD head parameters including one or more of change or delta in fly height (dFH), magnetic resistor resistance (MRR) value of the head, and servo variable gain amplifier (SVGA) readback amplitude values.

7. An apparatus for implementing head degradation detection and prediction for hard disk drives (HDDs), comprising:
a controller;
said controller calculating two or more confidence level indicators for predefined HDD head parameters;
said controller comparing said calculated confidence level indicators with a respective predefined threshold value for the predefined HDD head parameters for providing a head failure prediction; and
said controller identifying both soft error rate (SER) fluctuations and an error recovery procedure (ERP) count exceeding a prespecified threshold to provide the head degradation prediction.

8. The apparatus as recited in claim 7 includes control code stored on a non-transitory computer readable medium, and wherein said controller uses said control code to implement head degradation detection.

9. The apparatus as recited in claim 7 wherein said predefined HDD head parameters include change or delta in fly height (dFH), magnetic resistor resistance (MRR) value of the head, and servo variable gain amplifier (SVGA) readback amplitude values.

10. The apparatus as recited in claim 7 wherein said controller calculating two or more confidence level indicators for predefined HDD head parameters includes said controller calculating confidence intervals (CI) using maximum likelihood estimate (MLE) for predefined HDD head parameters.

11. The apparatus as recited in claim 10 includes said controller L-Lead time head parameter value predictions using an Auto Regressive Integrated Moving Average (ARIMA) HDD parameter time-series predictor apparatus.

12. The apparatus as recited in claim 11 wherein said Auto Regressive Integrated Moving Average (ARIMA) HDD parameter time-series predictor apparatus includes moving block bootstrap (MBB) for predefined HDD head parameters and ARIMA (p, d, q) filter coupled to said moving block bootstrap (MBB), wherein said moving block bootstrap (MBB) includes a bootstrap (block scrambled averaging) function, and said ARIMA(p, d, q) filter represent a finite-difference equation defined by AR-polynomial $\phi(B)$, of degree p, MA-polynomial $\theta(B)$ of degree q, in the variable B, $BX_T = X_{T-1}$ is the backward shift operator $$\theta(B)(1-B)^d X_t = \theta(B) X^*_T, \text{ where}$$

$(1-B)^d$ is the d-th differencing-operator that transforms $\{X_T\}$ into a stationary time series; and $\{X^*_T\}$ is its moving-block-average.

13. The apparatus as recited in claim 11 wherein said ARIMA (p, d, q) filter receives AR polynomial coefficients and MA polynomial coefficients, and said ARIMA (p, d, q) filter receiving inputs $X^*_T$ PN time series and $X_T$ d-differencing—data time series from said bootstrap (block scrambled averaging) function, and providing maximum likelihood estimate output $X^*_{T+L}$, where L=lead time predictor.

14. The apparatus as recited in claim 11 includes said controller calculating difference confidence interval values of the confidence intervals (CI) and (CI_bootstrap) for predefined HDD head parameters, and wherein said controller comparing said calculated confidence level indicators with a respective predefined threshold value for the predefined HDD head parameters includes said controller comparing said calculated difference confidence interval values with a respective predefined threshold value for the predefined HDD head parameters.

15. A system for implementing head degradation detection and prediction for hard disk drives (HDDs), comprising:
a hard disk drive (HDD), said HDD comprising a controller;
at least one disk; said disk including a disk media for storing data;
a slider carrying a head for reading and writing data;
said controller calculating two or more confidence level indicators for predefined HDD head parameters; and
said controller comparing said calculated confidence level indicators with a respective predefined threshold value for the predefined HDD head parameters including Auto Regressive Integrated Moving Average (ARIMA) (p, d, q)-prediction for providing head degradation detection and field failure prediction.

16. The system as recited in claim 15 includes control code stored on a non-transitory computer readable medium, and wherein said controller uses said control code to implement head degradation detection.

17. The system as recited in claim 15 wherein said predefined HDD head parameters include change or delta in fly height (dFH), magnetic resistor resistance (MRR) value of the head, and servo variable gain amplifier (SVGA) readback amplitude values used in an ARIMA(p,d,q)-field failure predictor.

18. The system as recited in claim 15 wherein said controller calculating two or more confidence level indicators for predefined HDD head parameters includes said controller calculating confidence intervals (CI) using maximum likelihood estimate (MLE) for predefined HDD head parameters, and said controller calculating confidence intervals (CI_bootstrap) using moving block bootstrap (MBB) for predefined HDD head parameters used in an ARIMA(p, d,q)-field failure predictor.

19. The system as recited in claim 18 includes said controller includes said controller calculating difference confidence interval values of the confidence intervals (CI) and (CI_bootstrap) for predefined HDD head parameters, and wherein said controller comparing said calculated confidence level indicators with a respective predefined threshold value for the predefined HDD head parameters includes said controller comparing said calculated difference confidence interval values with a respective predefined threshold value for the predefined HDD head parameters used in an ARIMA(p,d,q)-field failure predictor.

20. The system as recited in claim 15 includes said controller identifying both soft error rate (SER) fluctuations, and an error recovery procedure (ERP) count exceeding a prespecified threshold, to provide the head failure detection and ARIMA(p,d,q)-field failure prediction.

* * * * *